(12) United States Patent
Salciarini et al.

(10) Patent No.: US 11,457,720 B2
(45) Date of Patent: Oct. 4, 2022

(54) COSMETIC APPLICATOR COMPRISING PROJECTING LOOPS

(71) Applicant: Chanel Parfums Beauté, Neuilly-sur-Seine (FR)

(72) Inventors: Christian Salciarini, Hyeres (FR); Sophie Argiolas, Argenteuil (FR)

(73) Assignee: Chanel Parfums Beauté

( * ) Notice: Subject to any disclaimer, the term of this patent is extended or adjusted under 35 U.S.C. 154(b) by 589 days.

(21) Appl. No.: 16/060,321

(22) PCT Filed: Dec. 6, 2016

(86) PCT No.: PCT/FR2016/053225
§ 371 (c)(1),
(2) Date: Jun. 7, 2018

(87) PCT Pub. No.: WO2017/098134
PCT Pub. Date: Jun. 15, 2017

(65) Prior Publication Data
US 2019/0254407 A1 Aug. 22, 2019

(30) Foreign Application Priority Data
Dec. 7, 2015 (FR) ....................... 1561939

(51) Int. Cl.
| A45D 40/26 | (2006.01) |
| A46B 9/02 | (2006.01) |
| A46B 3/00 | (2006.01) |
| A46B 7/02 | (2006.01) |
| A46B 9/00 | (2006.01) |

(Continued)

(52) U.S. Cl.
CPC ............ *A45D 40/267* (2013.01); *A46B 3/005* (2013.01); *A46B 7/026* (2013.01); *A46B 9/005* (2013.01); *A46B 9/021* (2013.01); *A46B 2200/1053* (2013.01); *B29C 64/153* (2017.08);
(Continued)

(58) Field of Classification Search
CPC .. A45D 40/262; A45D 40/265; A45D 40/267; A46B 3/005; A46B 9/021; A46B 9/06; A46B 2200/1053; A46B 2200/106; A46B 1/00
See application file for complete search history.

(56) References Cited

U.S. PATENT DOCUMENTS

| 6,412,496 B1 | 7/2002 | Gueret |
| D682,556 S * | 5/2013 | Uresti .................... A46B 9/021 D4/128 |
| 8,919,351 B1 * | 12/2014 | Wang .................... A46B 9/021 132/218 |

FOREIGN PATENT DOCUMENTS

| DE | 202011050794 U1 | 9/2011 |
| DE | 202014102875 U1 | 7/2014 |
| WO | 2008113939 A2 | 9/2008 |

OTHER PUBLICATIONS

DE 20 2014 102 875 U1 EPO computer translation (Year: 2014).*
DE 20 2011 050 794 U1 EPO computer translation (Year: 2012).*
Third Party Observation against EP 16825456 dated May 15, 2019.

* cited by examiner

*Primary Examiner* — Rachel R Steitz
(74) *Attorney, Agent, or Firm* — St. Onge Steward Johnston & Reens LLC (57) ABSTRACT

The invention relates to a mascara applicator having an elongate general shape defining a longitudinal axis and includes projections. At least one of the projections forms a loop defining a through-hole having a main opening axis forming an angle of more than 45° with a plane radial to the longitudinal axis of the applicator.

21 Claims, 4 Drawing Sheets

(51) Int. Cl.
*B33Y 50/00* (2015.01)
*B33Y 80/00* (2015.01)
*B29C 64/153* (2017.01)
*B29L 31/00* (2006.01)

(52) U.S. Cl.
CPC ......... *B29L 2031/718* (2013.01); *B33Y 50/00* (2014.12); *B33Y 80/00* (2014.12)

COSMETIC APPLICATOR COMPRISING PROJECTING LOOPS

FIELD OF THE INVENTION

The invention relates to cosmetic applicators.

BACKGROUND OF THE INVENTION

Articles used to apply mascara are known. These article comprise an applicator in the form of a bottle brush or an injection-molded plastic brush. These brushes give good make-up results. However, manufacturers are always seeking ways to improve the result and the comfort of use for the user. Improvements include the search for better separation of the eyelashes, a better elongating and/or curving effect of the eyelashes, and application of mascara as regular as possible on the eyelashes. Manufacturers also try to reduce the frequency at which the user must insert the mascara applicator in the mascara container to reload it.

SUMMARY OF THE INVENTION

An object of the invention is therefore to improve mascara applicators.

The invention therefore relates to a mascara applicator having an elongate general shape defining a longitudinal axis and comprising projections, at least one of these projections forming a loop defining a through-hole having a main opening axis forming an angle of more than 45° with a plane radial to the longitudinal axis of the applicator.

When the applicator is inserted into the mascara container, the projection loops are loaded with mascara and form mini-containers which are not emptied when the applicator is taken out of the container, even if the latter comprises a wiper. These loops are oriented so as to favor the contact of the eyelashes with the mascara they contain. In addition, the eyelashes are made to move along the loops so that they are correctly coated with mascara without generating clumps. In particular, the application movement transmitted by the user causes one or more eyelashes to move along at least a part of the through-hole, the eyelash(es) being coated with mascara during this movement. A relatively large dose of mascara is therefore loaded onto the applicator on leaving the container, then applied on the eyelashes. The volume of the through-hole of a projection forming a loop may be chosen to correspond to a predetermined quantity of mascara to be applied to one or more eyelashes. This therefore ensures that the right quantity of mascara is applied, in order, for example, to avoid the formation of clumps. In addition, the fact that the volume of the through-hole can receive a small number of eyelashes, for example only one eyelash, helps to separate the eyelashes and therefore improves the make-up result. Furthermore, the projecting loops reduce the aggressiveness of the brush as it approaches an eye, and they reduce the apprehension that the user may feel when the brush is handled near the cornea.

The angle could be more than 60°, or even more than 70°, and preferably more than 80°.

Preferably, the main axis of the through-hole lies in a plane perpendicular to the longitudinal axis of the applicator.

This orientation considerably improves the contact of the eyelashes with the mascara carried in the loops, for an even better make-up result which is particularly easy to obtain.

The through-hole could have an elliptical general shape.

The through-hole and the outer contour of the projections could also have an elliptical general shape.

This shape matches the shape of the eyelashes and therefore improves the make-up result.

The through-hole could also have edges forming a non-planar curve.

This special arrangement improves the contact of the eyelashes with the mascara carried by the loops, in particular if the user holds the applicator in an orientation which is not horizontal, for example at an angle.

The through-hole could also have chamfered edges 19.

In particular, this avoids sharp edges on at least part of the edge of the through-hole and makes it easier for the eyelashes to enter the through-hole in order to be coated with mascara.

The projection forming a loop could also have a non-rectilinear general shape, preferably wavy, when looking at the applicator from one of its free ends.

The applicator could also comprise straight projections.

Such projections make it easier to spread the mascara on the eyelashes to avoid the formation of clumps thereon. These projections may for example lie in a plane radial to the longitudinal axis of the applicator.

The presence of one or more straight projections upstream from one or more projections forming a loop separates the eyelashes before they are loaded with the mascara present in the through-holes of these projections. This characteristic helps to obtain a better make-up result.

The presence of one or more straight projections downstream from one or more projections forming a loop helps to evenly spread the mascara which has just been applied on the eyelashes and to separate these eyelashes, these two effects each individually helping to improve the make-up result.

At least one projection could comprise one or more secondary projections extending therefrom, preferably from its base.

The presence of such projections offers several advantages. Firstly, they improve the spreading of the mascara on the eyelash, thereby avoiding the formation of clumps. Secondly, they also improve the separation of the eyelashes before or after they have been loaded with mascara.

There could be at least three projections forming a loop which would form a row.

The advantage of such a configuration is that the mascara can be uniformly applied over an entire row of eyelashes.

Preferably, the projections of the row or of at least one of the rows lie in the same plane radial to the longitudinal axis of the applicator.

This arrangement further improves the uniformity with which the mascara will be applied on the row of eyelashes.

Preferably, the applicator comprises several rows of projections forming a loop, these rows having with respect to each other a symmetry of revolution about the longitudinal axis of the applicator.

The rows of projections could also be offset along the longitudinal axis of the applicator.

The row or at least one of the rows of projections could also comprise only projections forming a loop.

Consequently, the mascara will be applied in the same way on all the eyelashes, allowing once again uniform application of the mascara.

Advantageously, at least one portion of each projecting loop of a row of projecting loops is in contact with the projections preceding and/or following it in the row.

The applicator could also comprise flaps, each flap being composed of at least:

a first panel, and
at least a second panel connected to a core of the applicator by the first panel and carrying projections.

Other panels can be present. For example, a third panel can be used to connect the first panel to the second panel.

Preferably, the first panel is used to connect the second panel to the rest of the applicator. This connection can be made, or not, via a core of the applicator.

Preferably, the first panels connect together the second panels of the flaps. For example, the first panels, each connected to a second panel, can be connected together by one of their internal edges. In a special embodiment, the connection of these first panels forms the core of the applicator.

Preferably, the first panels have a parallelepipedic general shape and the second panels have a slightly concave parallelepipedic general shape. Obviously, the first and second panels may have other shapes. For example, the second panels may have a plane or wavy general shape when looking from the free end of the applicator.

The number of flaps may vary. An applicator could have at least one flap, or even at least two flaps, preferably at least three flaps.

The panels can extend over a large part of the length of the applicator, preferably over its entire length. The panels could also extend over a small part of the length of the applicator.

Preferably, the first panels of the various flaps all have the same dimensions.

Also preferably, the second panels of the various flaps all have the same dimensions.

The first panel could also lie in a plane radial to the longitudinal axis of the applicator.

The through-hole of at least one projection forming a loop could also extend in the first panel.

In particular, this allows the mascara present between the first panels once the applicator has been removed from a mascara container to move between these panels in order to be distributed between them.

The first and second panels of a flap could form a cavity.

Thus, this cavity could contain mascara once the applicator has been removed from a mascara container. This cavity therefore also forms a mascara reserve when the applicator has been removed from the container, thereby reducing the number of times that the user needs to reinsert the applicator in the container. The volume of this cavity depends in particular on the angle formed by these two panels. Preferably, this angle is less than 90°, in particular less than 75° or 60°, preferably less than 45°. The cross-section of the cavity could vary along the longitudinal axis of the applicator. Preferably, it is constant over a larger part of the cavity. More preferably, this cross-section is constant over a median part of the cavity and decreases at its ends.

In addition, the projections could all extend from one side of the second panel opposite the cavity.

Thus, no projection is present on the side opposite the cavity. This allows in particular the mascara to flow more easily between the first panels forming the cavity, thereby simplifying its distribution.

Preferably, projections present on the second panel extend, from this panel, in a plane radial to the longitudinal axis of the applicator.

The second panel could have at least one row of projections forming a loop and at least one row of projections with no loop, i.e. solid, for example straight. For example, the second panel could have one row of projections forming a loop and two rows of solid projections. Preferably, it has one row of projections forming a loop and three rows of solid projections. Several arrangements are possible for the relative positions of the rows with respect to each other on a given panel. For example, rows formed by projections forming a loop could alternate with rows formed by solid projections.

Preferably, one row of projections forming a loop could be located on one edge of the panel and the rest of the panel could be occupied by at least one row of solid projections, even at least two rows of straight projections, preferably at least three rows of solid projections.

As an alternative, the second panel could have only projections forming a loop or have only solid projections.

The applicator could be made in one piece.

The advantage of a one-piece applicator is that it is faster to manufacture. The applicator may be made of a single material or of several different materials.

Several techniques are available to manufacture a one-piece applicator, for example injection molding or additive synthesis. Preferably, the applicator is manufactured by additive synthesis. The advantage of this type of manufacture is, in particular, that it can be used to produce applicators of complex structure, which it would be difficult or even impossible to produce by injection.

Various additive synthesis methods known by those skilled in the art can be used to manufacture the invention. They include, for example, selective laser sintering (SLS) and stereolithography (SLA). An example of a method of manufacturing a cosmetic applicator by additive synthesis is described in application WO 2008/113939 in the name of the applicant.

The invention also provides for a method of manufacturing by additive synthesis an applicator as described previously, comprising the following steps:
  obtaining data concerning the applicator; and
  additive synthesis of the applicator using the data.

The invention also provides for a computer file comprising data that can be used by a computer program to control the implementation of the method as described previously.

The invention also provides for an electronic storage medium comprising stored data to implement the method as described previously.

Lastly, the invention also provides for a method of obtaining a file as described previously in order to download it on a telecommunication network.

DETAILED DESCRIPTION OF THE INVENTION

We will now describe this embodiment of the article and of the method according to the invention, in reference to FIGS. 1 to 7.

The mascara applicator 1 described in this embodiment is part of a cosmetic article 2 comprising a cap or plug 3, to which the applicator 1 is rigidly attached, and a case 4 comprising a mascara container 5 and a wiper 6 (see FIG. 1) housed in a collar of the container on which the cap can be removably attached, for example screwed, to close the container and the article. The applicator thus extends in the container and is immersed in the product.

Obviously, other types of mascara applicator article can be considered such as for example "pen" type articles in which the applicator is not connected to a cap or articles in which the applicator is not immersed in the mascara reserve when not used.

The applicator is carried by a rod 8 which connects it to the cap. The applicator has an elongate oval general shape along its longitudinal axis 9. The rod 8 has a cylindrical general shape and its longitudinal axis is coincident with the longitudinal axis 9 of the applicator. The rod and the applicator are connected together by one of their ends (see FIG. 2).

The applicator could have other general shapes, for example a spherical, parallelelipedic or cubic general shape.

The Applicator

The applicator described comprises three flaps 13, but could have more or less. For example, the applicator could have two, four, five or six flaps.

These flaps 13 are identical. They are evenly distributed around the axis 9 and each composed of a first panel 14 and a second panel 15. The first panels 14 have the shape of a parallelepiped which extends over almost the entire length of the applicator. The second panels have the shape of a slightly concave parallelepiped which extends over almost the entire length of the applicator. The first and second panels may obviously have other shapes.

The three flaps 13 are connected together by an internal edge of the first panel 14, this connection forming the core of the applicator 16. The other edge of the first panel, the outer edge, is connected to a proximal edge of the second panel, with the other edge of this second panel, the distal edge, being free.

The first panel 14 of each flap lies in a plane radial to the axis 9. The second panel 15 has a general orientation which forms an acute angle with the first panel, for example of about 50° or 60° in cross-section in a plane perpendicular to the axis as shown on FIG. 6. In this case, the second panel 15 is arranged in an orientation that is circumferential to the axis 9, the curvature of the panel following the direction of this circumference. Thus, in the cross-sectional plane of FIG. 6, the cross-sections of the three flaps lie on the same circle centered on this axis and form sections or arcs of this circle. In this case, this configuration gives the cross-section a trident general shape.

The first 14 and second 15 panels of each flap 13 form between them a cavity 21 able to contain mascara.

The three flaps 13 have a symmetry of revolution about the longitudinal axis 9 of the applicator. This longitudinal axis goes through the core 16 of the applicator.

The applicator further comprises several types of projection extending, from an outer side 23 of the second panels 15, each one in a plane radial to the longitudinal axis 9 of the applicator. The applicator thus comprises projections 10 forming a loop, main straight solid projections 11 and secondary straight solid projections 12 extending from the base of the main straight solid projections, with two secondary projections for each main projection.

The projections described here are arranged in rows of projections in which each row comprises only one type of projection. The projections of a given row, apart from the secondary straight projections 12, all lie in the same plane radial to the longitudinal axis 9 of the applicator. In the present case, each second panel 15 of a flap 13 carries on its outer side 23 one row of projections 10 forming a loop, three rows of main straight solid projections 11, and six rows of secondary solid projections 12. More precisely, starting from the proximal edge of the second panel 15 connected to the first panel and going towards its free distal edge, we find in this order the row of projections 10 forming a loop, a group of one row of secondary projections 12, of one row of main projections 11 and of one row of secondary projections 12, then two groups identical to this group. Obviously, other embodiments may be considered, in which the number and type of rows of projections present on the second panels are different.

In an alternative embodiment, the rows of projections may be arranged in another conformation in which all the projections forming a row would not lie in the same radial plane.

Rows comprising not only one type of projection but at least two types of projection could be considered. For example, a row could comprise projections forming a loop and solid projections.

The three rows of main solid projections of a given panel have the same number of projections, which means that we can say that these rows have homologous projections. In a group of three homologous main solid projections 11, the projections lie in respectively different planes transverse to the longitudinal axis 9. These various transverse planes are therefore offset along this longitudinal axis. Within a given group of homologous projections, the offset could be constant between the transverse planes of two successive projections.

The projections forming a loop have a non-rectilinear general shape, in this case wavy, when looking at the applicator from one of its free ends. Other shapes could be used in other embodiments. In addition, they have an elliptical general shape when looking at the loop from the front and also have through-holes 17 of elliptical general shape. These through-holes extend into the first 14 and second 15 panels of the flaps 13 on which the projections rest. This has the effect, in particular, of allowing the three cavities 21 formed by the three flaps to communicate together.

In other embodiments not shown here, the projections forming a loop and/or their through-holes could have a different shape, for example rectangular or circular.

In the embodiment described, the projections 10 forming a loop extend in a row along the edge of the second panel 15 which is connected to the first panel 14. This row could be located elsewhere on the second panel, for example in the middle or on its free end.

Figure 1:
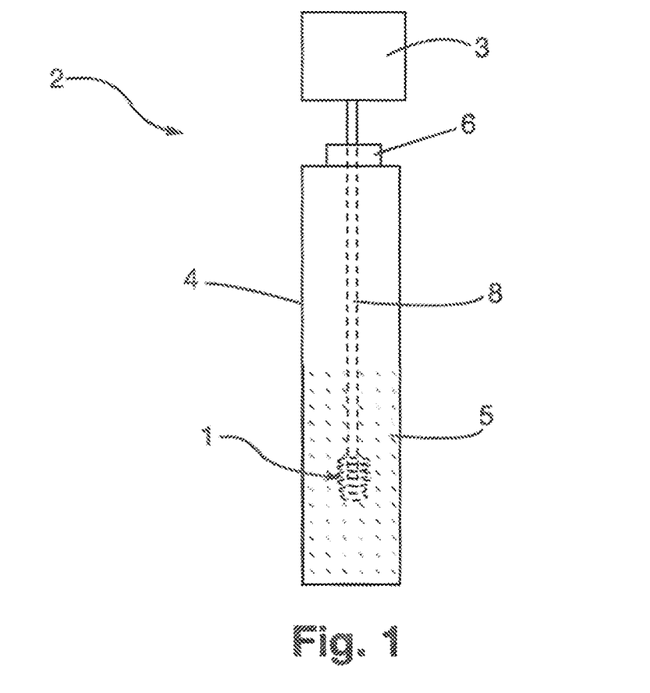
FIG. 1 is a diagrammatic longitudinal cross-section of a cosmetic article according to one embodiment of the invention.
Figure 2:
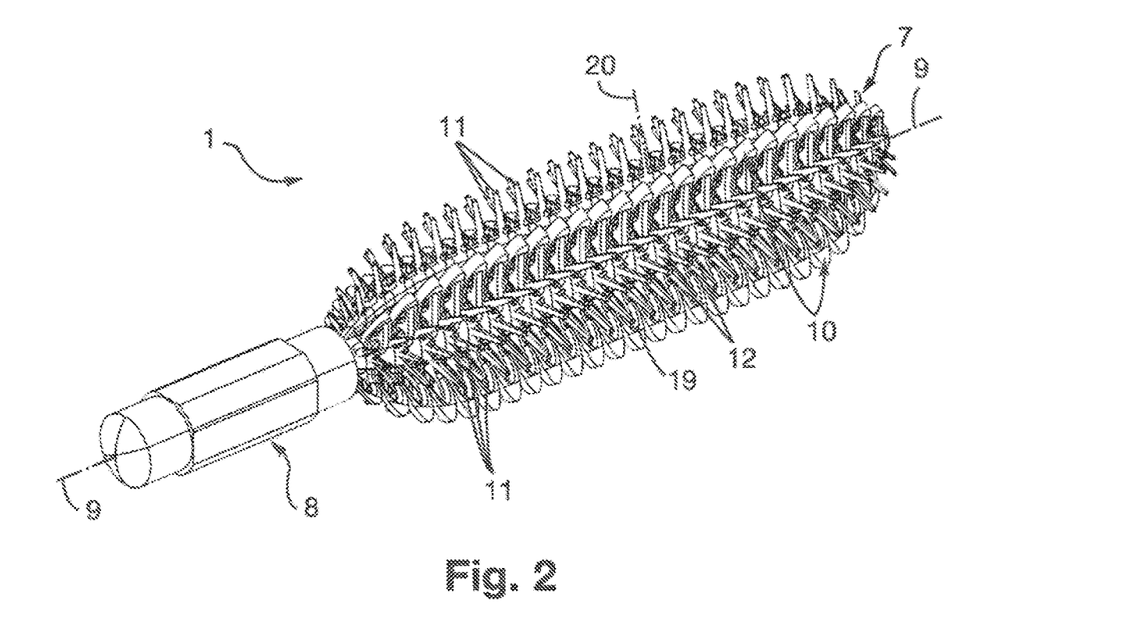
FIGS. 2 and 3 are respectively perspective and side views of the mascara applicator of the article shown on FIG. 1.
Figure 3:
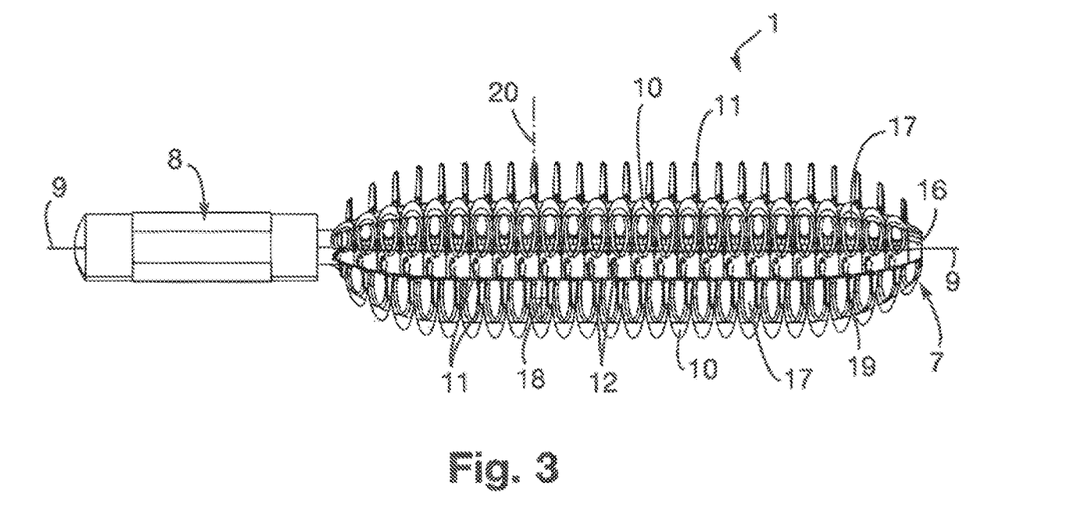
Figure 4:
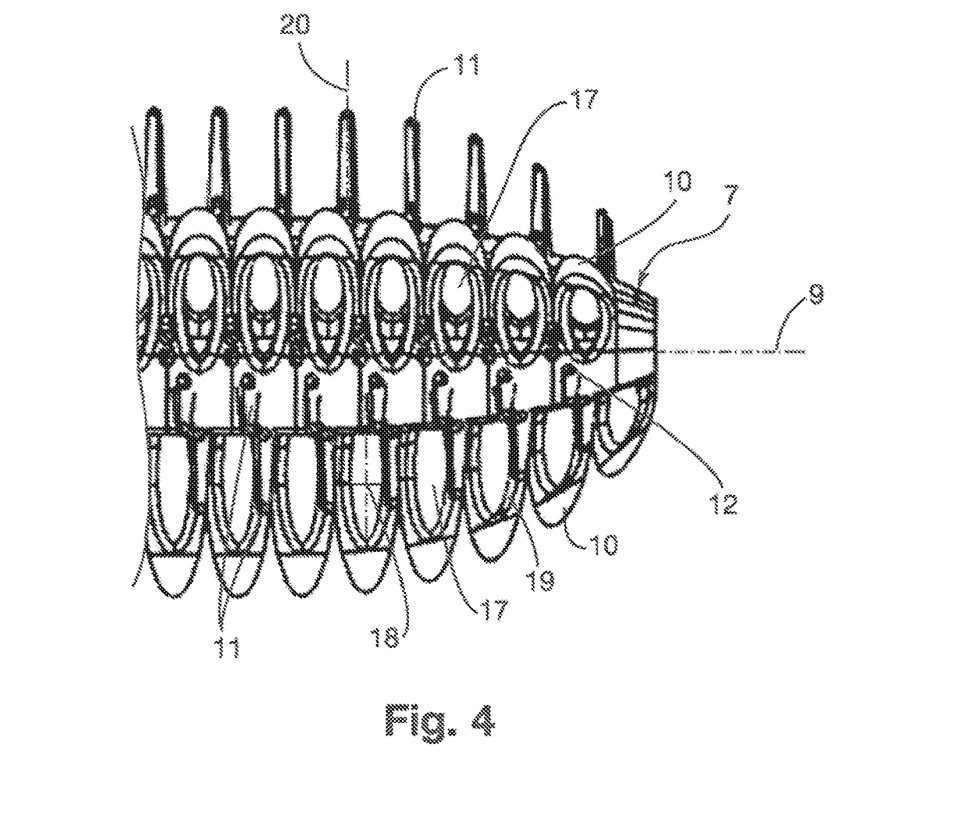
FIG. 4 is an enlarged view of the free end of the applicator shown on FIG. 3.
Figure 6:
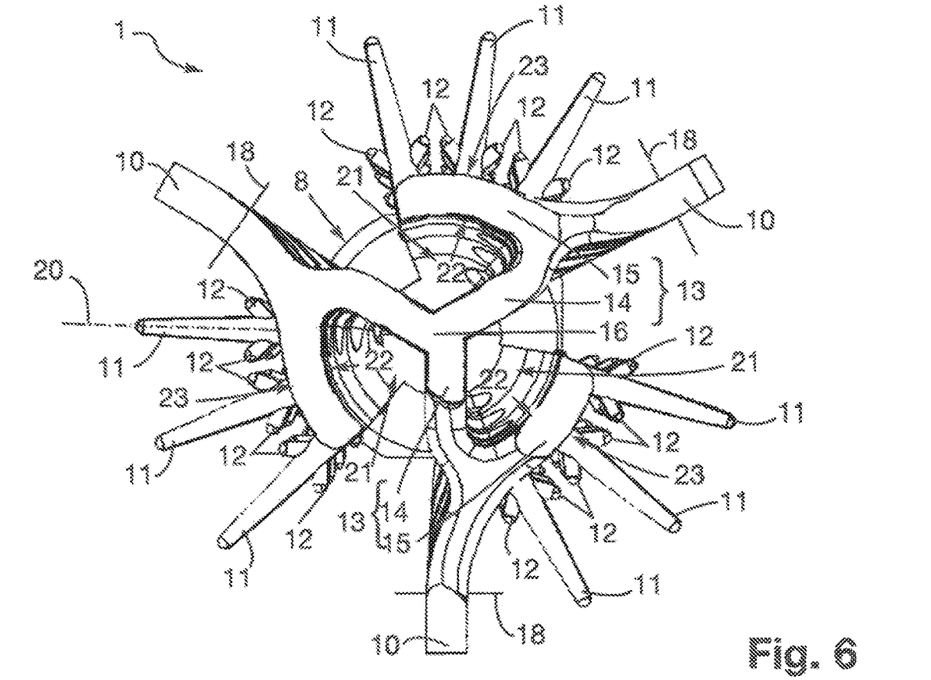
FIGS. 6 and 7 are views respectively from the free end and in perspective of a transverse cross-section of the applicator shown on FIG. 1.
Figure 7:
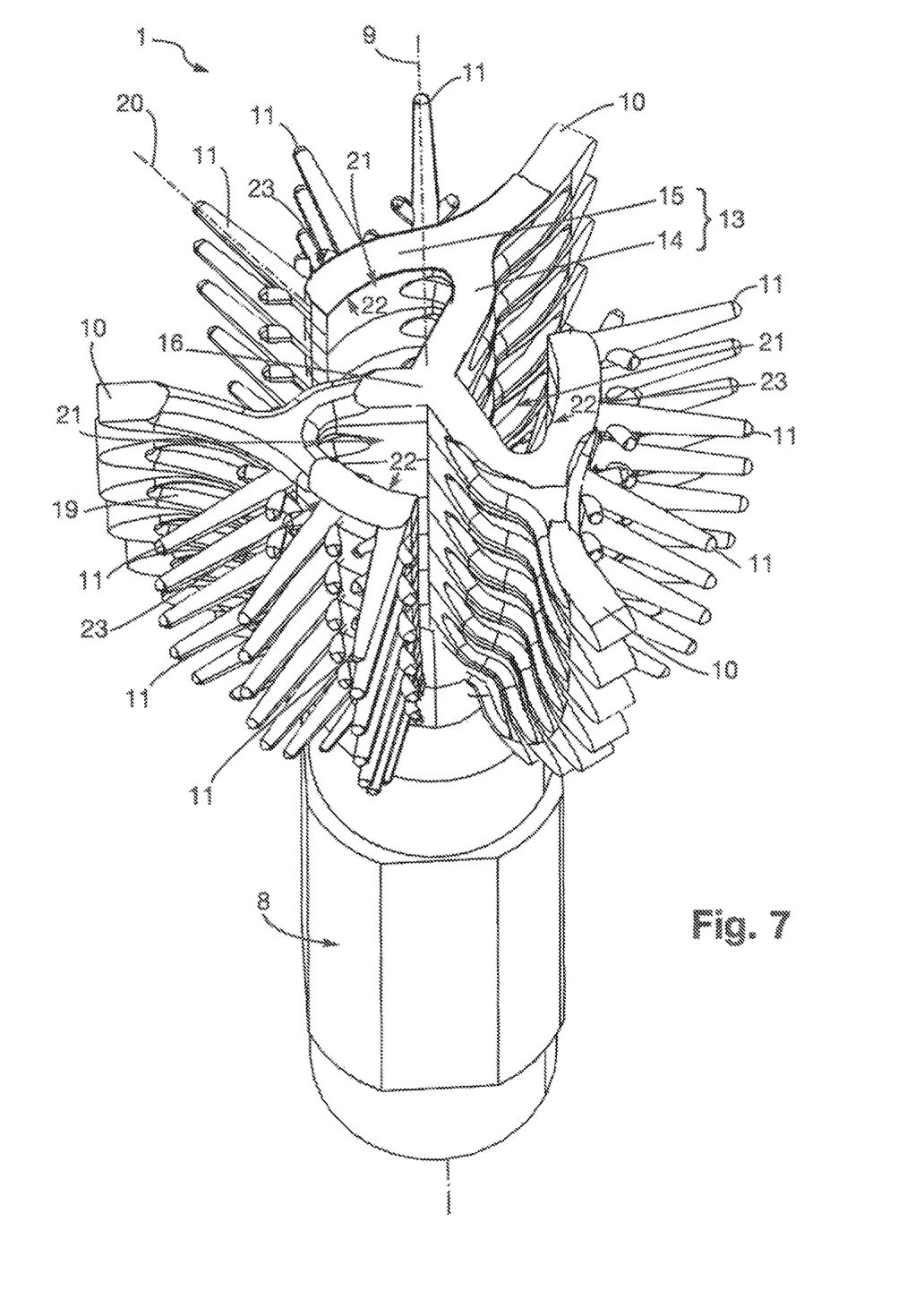

The through-holes 17 of the projections 10 forming a loop have a main opening axis 18 which lies in this case in a plane perpendicular to the longitudinal axis of the applicator, as shown on FIGS. 4 and 6. Its forms a 90° angle with the plane radial to the axis in which the projections forming a loop of the row extend globally. In other embodiments, the axis 18 makes an angle of more than 45° with this radial plane. Preferably, this angle is more than 60°, in particular more than 70°, and preferably more than 80°.

Figure 5:
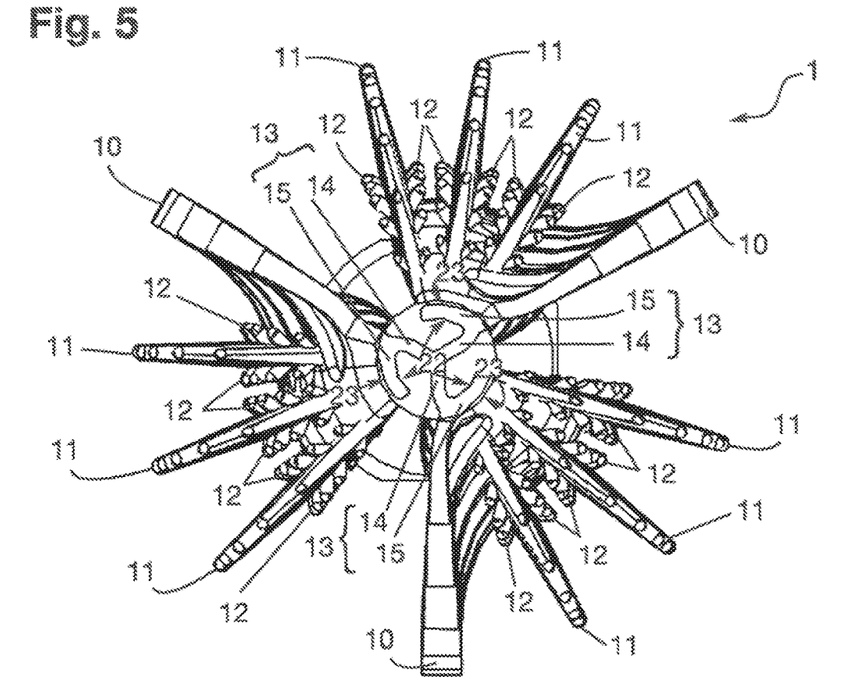
FIG. 5 is a view, from its free end, of the applicator shown on FIGS. 1 to 4.

The edges 19 of the through-holes 17 of the projections 10 forming a loop form non-planar curves when looking from a free end of the applicator (see FIGS. 5 and 6). Obviously, these through-holes could form planar curves.

In addition, these edges 19 are chamfered.

In the embodiment described, each straight main solid projection 11 comprises two secondary projections 12 extending from its base, i.e. its non-free end which is connected to the second panel 15 of the flap 13. These secondary projections are also straight. The two secondary projections 12 of a given main projection 11 lie in the same plane radial to the longitudinal axis 9. The two secondary projections 12 of a given straight projection 11 are arranged in axial symmetry each side of the main projection. Obviously, the secondary projections 12 may be arranged differently along their main projection 11. For example, they could be located near its free end. The two secondary projections may be located at different levels along the main projection 11 carrying them and may also lie in two different planes. These secondary projections 12 are not necessarily straight and may, for example, be curved or wavy. The number of these secondary projections 12 may vary on a given main projection 11 and therefore be greater than or less than two, for example one, three, four or five secondary projections 12, and main projections 11 may carry a different number of secondary projections 12.

The Manufacturing Method

The applicator described above is manufactured in one piece. More particularly, this applicator is manufactured by additive synthesis, also known as 3D printing.

Any suitable material can be used to make the brush, the material may be solid or elastically flexible. It may be a plastic, for example a polyamide, in particular a polyamide 1102, a PEBA 2301, or an ABS type resin, or a powdered metal such as a stainless steel or titanium.

Several additive synthesis methods may be used to manufacture an applicator as described previously. We may mention in particular selective laser sintering from powdered material, and stereolithography (SLA). In the present case, a selective laser sintering method is used, this method offering the advantage of allowing objects of complex shape to be manufactured.

The applicator is first designed using computer-aided design (CAD) software. A file in STL format with the applicator design data is therefore created and then exported. Other standard file formats for additive synthesis may be used.

This file is then processed by software supplied by the manufacturer of the machine used to carry out the additive synthesis. This software breaks down the file into sections in the form of about hundred digital images in SLI or BFF format, each image corresponding to a layer of the model to be printed, i.e. to a section of the applicator taken in a plane perpendicular to the axis 9. These data are then sent to the printer to produce the applicator.

Once the synthesis is finished, treatments may be applied to the applicator, for example to improve its appearance.

Obviously, numerous modifications can be made without leaving the scope of the invention.

The flaps and the special projections of the applicator described above could be used independently of each other.

The embodiment described above concerns mascara applicators, but those skilled in the art would also easily be able to apply these characteristics to other types of cosmetic applicator such as nail polish applicators or cosmetic applicators for the eyebrows or the hair.

The invention claimed is:

1. A mascara applicator comprising an elongate general shape defining a longitudinal axis and having projections, at least one of these projections forming a loop defining a through-hole having a main opening axis forming an angle of more than 45° with a plane radial to the longitudinal axis of the applicator;
   wherein the applicator further comprises flaps, each flap being composed of:
      at least a first panel, and
      at least a second panel connected to a core of the applicator by the first panel and carrying additional projections;
   wherein the projections forming a loop are located between the core and the additional projections.

2. The applicator according to claim 1, wherein the main axis of the through-hole lies in a plane perpendicular to the longitudinal axis of the applicator.

3. The applicator according to claim 1, wherein the through-hole has an elliptical general shape.

4. The applicator according to claim 1, wherein the through-hole has edges forming a non-planar curve.

5. The applicator according to claim 1, wherein the through-hole has chamfered edges.

6. The applicator according to claim 1, wherein the projection forming a loop has a non-rectilinear general shape.

7. The applicator of claim 6 wherein the projection has a wavy general shape, when looking at the applicator from one of its free ends.

8. The applicator according to claim 1, wherein at least one projection forming a loop comprises one or more secondary projections extending therefrom.

9. The applicator according to claim 1, wherein the projections (10) forming a loop are at least three and form at least one row.

10. The applicator according to claim 9, wherein the projections of the row or of at least one of the rows all lie in the same plane radial to the longitudinal axis of the applicator.

11. The applicator according to claim 9, wherein the applicator comprises several rows of projections forming a loop, these rows having with respect to each other a symmetry of revolution about the longitudinal axis of the applicator.

12. The applicator according to claim 9, wherein the row or at least one of the rows comprises only projections forming a loop.

13. The applicator according to claim 1, wherein the first panel lies in a plane radial to the longitudinal axis of the applicator.

14. The applicator according to claim 1, wherein the through-hole of at least one projection forming a loop extends in the first panel.

15. The applicator according to claim 1, wherein the first and second panels form a cavity.

16. The applicator according to claim 15, wherein the projections all extend from one side of the second panel opposite the cavity.

17. The applicator according to claim 1, wherein the applicator is made in one piece.

18. The method of manufacturing by additive synthesis an applicator according to claim 1, comprising the following steps:
    obtaining data concerning the applicator; and
    additive synthesis of the applicator using the data.

19. The method of claim 18 further comprising a computer file comprising data that can be used by a computer program to control the implementation of the method.

20. The method of claim 18 further comprising an electronic storage medium comprising stored data to implement the method.

21. The method of claim 19 further comprising obtaining the computer file in order to download the computer file on a telecommunication network.

* * * * *